(12) United States Patent
D'Angelo et al.

(10) Patent No.: US 8,571,823 B2
(45) Date of Patent: Oct. 29, 2013

(54) METHOD FOR CONTROLLING THE QUALITY OF INDUSTRIAL PROCESSES, IN PARTICULAR LASER-WELDING PROCESSES

(75) Inventors: Giuseppe D'Angelo, Grugliasco (IT); Giorgio Pasquettaz, Vercelli (IT); Andrea Terreno, Orbassano (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 294 days.

(21) Appl. No.: 12/724,724

(22) Filed: Mar. 16, 2010

(65) Prior Publication Data

US 2010/0228377 A1   Sep. 9, 2010

Related U.S. Application Data

(62) Division of application No. 11/033,498, filed on Jan. 12, 2005, now Pat. No. 7,728,254.

(30) Foreign Application Priority Data

Jan. 13, 2004 (IT) .............................. TO2004A0013

(51) Int. Cl.
*G06F 11/00* (2006.01)
*G06F 17/40* (2006.01)
*B23K 26/00* (2006.01)

(52) U.S. Cl.
USPC ... 702/81; 702/182; 219/121.62; 219/121.63; 700/110; 700/166; 73/865.8; 250/205; 250/206; 372/9; 372/31; 378/58; 378/141

(58) Field of Classification Search
USPC .......................... 219/121.61–121.72, 121.83, 219/121.82–121.85; 700/108–110, 166; 702/40, 81, 182; 73/865.8; 250/205, 250/206; 315/149, 157; 372/9, 31; 378/22, 378/58, 141
See application file for complete search history.

(56) References Cited

U.S. PATENT DOCUMENTS

| 3,659,974 A | * | 5/1972 | Neugroschl .................. 425/34.1 |
| 4,813,288 A | * | 3/1989 | Gamberini ................... 73/865.8 |
| 4,877,940 A | * | 10/1989 | Bangs et al. ............. 219/124.34 |

(Continued)

FOREIGN PATENT DOCUMENTS

| DE | 19962967 A1 | 7/2001 |
| EP | 1238744 A1 | 9/2002 |

(Continued)

*Primary Examiner* — Samuel M Heinrich
(74) *Attorney, Agent, or Firm* — Sughrue Mion, PLLC

(57) ABSTRACT

A system and a method for controlling the quality of an industrial process, of the type that comprises the steps of: providing one or more reference signals for the industrial process; acquiring one or more real signals that are indicative of the quality of said industrial process; and comparing said one or more reference signals with said one or more real signals in order to identify defects in said industrial process. According to the invention, the method moreover comprises the operations of: obtaining a transformed signal from said reference signal; obtaining a transformed signal from said real signal; and calculating energies of said transformed reference signal and said real signal, respectively, said comparison operation comprising; comparing with one another said energies of said transformed reference signal and said transformed real signal, respectively, in order to extract corresponding time-frequency distribution for selected frequency values; calculating energies of said time-frequency distributions; and comparing the energies of said time-frequency distributions with threshold values in order to identify energy values associated to defects.

6 Claims, 5 Drawing Sheets

(56) References Cited

U.S. PATENT DOCUMENTS

| | | | |
|---|---|---|---|
| 5,121,339 A * | 6/1992 | Jenuwine et al. | 702/40 |
| 5,410,406 A | 4/1995 | Webster | |
| 5,486,677 A | 1/1996 | Maischner et al. | |
| 5,517,420 A | 5/1996 | Kinsman et al. | |
| 5,553,614 A | 9/1996 | Chance | |
| 5,651,903 A | 7/1997 | Shirk | |
| 5,659,479 A | 8/1997 | Duley et al. | |
| 5,698,120 A * | 12/1997 | Kurosawa et al. | 219/121.62 |
| 5,874,708 A | 2/1999 | Kinsman et al. | |
| 5,986,252 A * | 11/1999 | Kawamura | 250/205 |
| 6,181,888 B1 | 1/2001 | Scheuer et al. | |
| 6,335,504 B1 | 1/2002 | Ling et al. | |
| 6,400,741 B1 | 6/2002 | Matsunaga et al. | |
| 6,549,022 B1 | 4/2003 | Cole, Jr. et al. | |
| 6,661,820 B1 | 12/2003 | Camilleri et al. | |
| 6,674,044 B2 | 1/2004 | Bolognese et al. | |
| 6,914,215 B2 | 7/2005 | Davis et al. | |
| 7,107,118 B2 | 9/2006 | Orozco et al. | |
| 7,124,063 B2 * | 10/2006 | D'Angelo et al. | 702/188 |
| 7,440,870 B2 * | 10/2008 | D'Angelo et al. | 702/188 |
| 7,640,125 B2 * | 12/2009 | D'Angelo et al. | 702/81 |
| 7,702,476 B2 * | 4/2010 | D'Angelo et al. | 702/84 |
| 2002/0144984 A1 | 10/2002 | Mori et al. | |
| 2009/0001262 A1 | 1/2009 | Visser et al. | |

FOREIGN PATENT DOCUMENTS

| | | |
|---|---|---|
| EP | 1275464 A1 | 1/2003 |
| EP | 1371443 A1 | 12/2003 |
| JP | 40-9057476 | 3/1997 |
| JP | 2003-053569 A | 2/2003 |

* cited by examiner

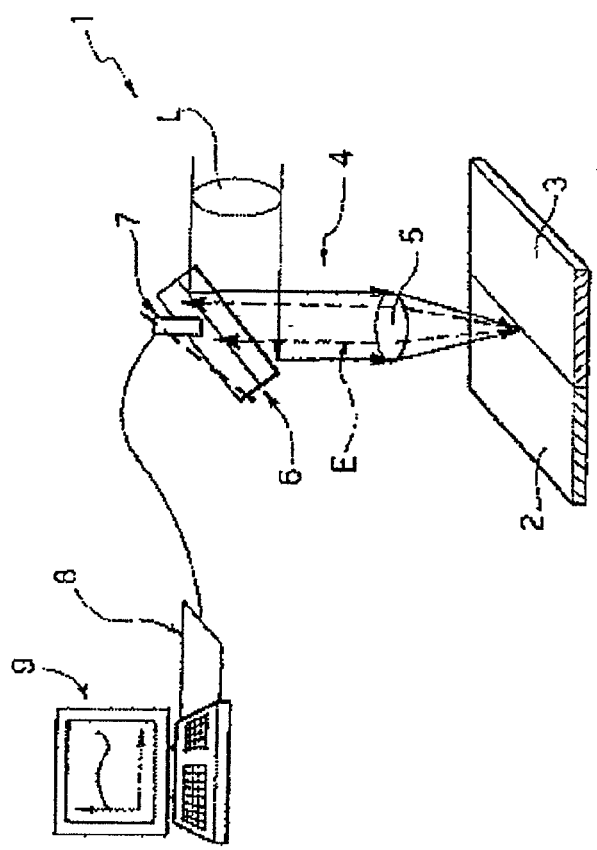
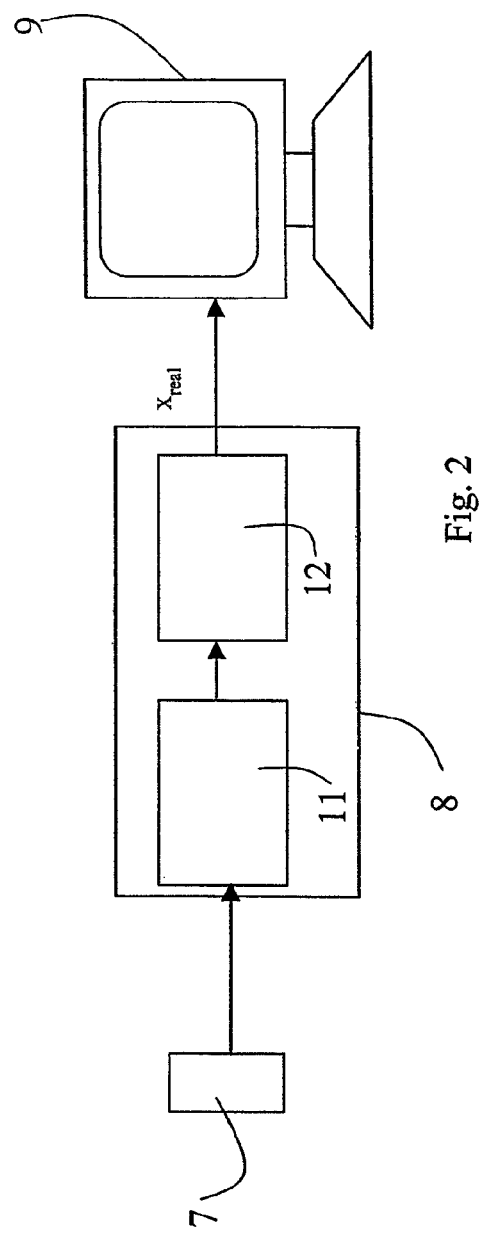
Fig. 1
Fig. 2

METHOD FOR CONTROLLING THE QUALITY OF INDUSTRIAL PROCESSES, IN PARTICULAR LASER-WELDING PROCESSES

CROSS REFERENCE PARAGRAPH

This is a Divisional of application Ser. No. 11/033,498, filed on Jan. 12, 2005 now U.S. Pat. No. 7,728,254, which claims the benefit of priority from Italian Patent Application No. TO2004-A000013, filed on Jan. 13, 2004. The entire disclosures of the prior applications are considered part of the disclosure of the accompanying divisional application and are hereby incorporated by reference in their entirety.

BACKGROUND OF THE INVENTION

The present invention relates to methods for controlling the quality of an industrial process, comprising the steps of:
  providing one or more reference signals for an industrial process;
  acquiring one or more real signals that are indicative of the quality of said industrial process; and
  comparing said one or more reference signals with said one or more real signals in order to identify defects in said industrial process.

Monitoring of the defects in industrial processes assumes increasing economic importance on account of its impact on the analysis of quality of industrial products. The possibility of obtaining an on-line and automatic assessment of the quality of an industrial process presents many advantages both from the economic point of view and from the standpoint of the speed of the process. Desirable characteristics of the system are hence:
  on-line and real-time processing; and
  capacity for accurate recognition of the main defects in production.

Currently the problem of recognition of the quality of an industrial process, and consequently the identification of defects, is approached by an inspection carried out off line by skilled staff, or else using automatic methods, which, by means of sensors, identify only some of the defects listed above, in a way that is far from satisfactory and is moreover sensitive to the different settings of the machine.

There are known methods and systems for controlling the quality in industrial processes, for example applied to on-line monitoring of the laser-welding process, in particular in the case of welding of sheet metal. The control system is able to assess the presence of porosities in the welding area or else, in the case of butt-welded thin sheet metal, the presence of defects due to overlapping or poor jointing of the sheet metal.

The above used systems base quality control on a comparison between the signals detected during the process and one or more predetermined reference signals indicating a good-quality weld. Said reference signals, which usually range in number between two and ten, are arranged starting from a number of samples of good-quality welds. Obviously, said mode of procedure implies the presence of a skilled operator who is able to certify the goodness of the weld at the moment of creation of the reference signals, and involves expenditure in terms of time and sometimes also in terms of waste of material (used for making the samples necessary for obtaining the reference signals). In some cases there are also pre-arranged reference signals indicating a defective weld, this, however, involving additional problems and difficulties.

From the European patent application No. EP-A-1275464 filed in the name of the present applicant, it is known to split into blocks the signal acquired via photodiode, which collects the radiation emitted by a welding spot, calculating the mean of the signal in each block sampled and considering the blocks having a value smaller than or equal to the offset of the photodiode as indicating the presence of a defect. Said method eliminates the need for the reference signal; however, it enables only a very approximate detection of the defects.

SUMMARY OF THE INVENTION

The aim of the present invention is to overcome all the aforesaid drawbacks.

In order to achieve such aim, the object of the present invention is a method for controlling the quality of industrial processes which has the characteristics indicated at the beginning and is further characterized in that said method further comprises the operations of:
  obtaining a transformed signal from said reference signal;
  obtaining a transformed signal from said real signal; and
  calculating energies of said transformed reference signal and said real signal,
  said comparison operation comprising:
  comparing with one another said energies of said transformed reference signal and said transformed real signal for extracting corresponding time-frequency distributions for selected frequency values;
  calculating energies of said time-frequency distributions; and
  comparing the energies of said time-frequency distributions with threshold values in order to identify the energy values associated to defects.

In the preferred embodiment, said steps of obtaining a transformed signal from said reference signal and of obtaining a transformed signal from said real signal comprise a filtering operation by means of the application of a discrete wavelet transform (DWT), whilst said operation of comparing said energies of said transformed reference signal and said transformed real signal for obtaining corresponding time-frequency distributions comprises performing a calculation of the conjugate of the Fourier transform of the envelope of the real signal and of the envelope of the normalized signal, to obtain a real conjugated transformed signal and a reference conjugated transformed signal, respectively, as well as comparing the energies of the reference signal and of the real signal, extracting the frequency values for which the energy of the real signal is greater than that of the reference signal.

Of course, a further object of the invention is the system for controlling the quality of industrial processes that implements the method described above, as well as the corresponding computer product, directly loadable into the memory of a computer, such as a processor, and comprises software code portions for performing the method according to the invention when the product is run on a computer.

BRIEF DESCRIPTION OF THE DRAWINGS

Further characteristics and advantages of the invention will emerge from the ensuing description, with reference to the annexed drawings, which are provided purely by way of non-limiting example and in which:
FIG. 1 is a block diagram representing a system implementing the method according to the invention;
FIG. 2 shows a detail of the system of FIG. 1.

DETAILED DESCRIPTION OF THE INVENTION

Figure 3:
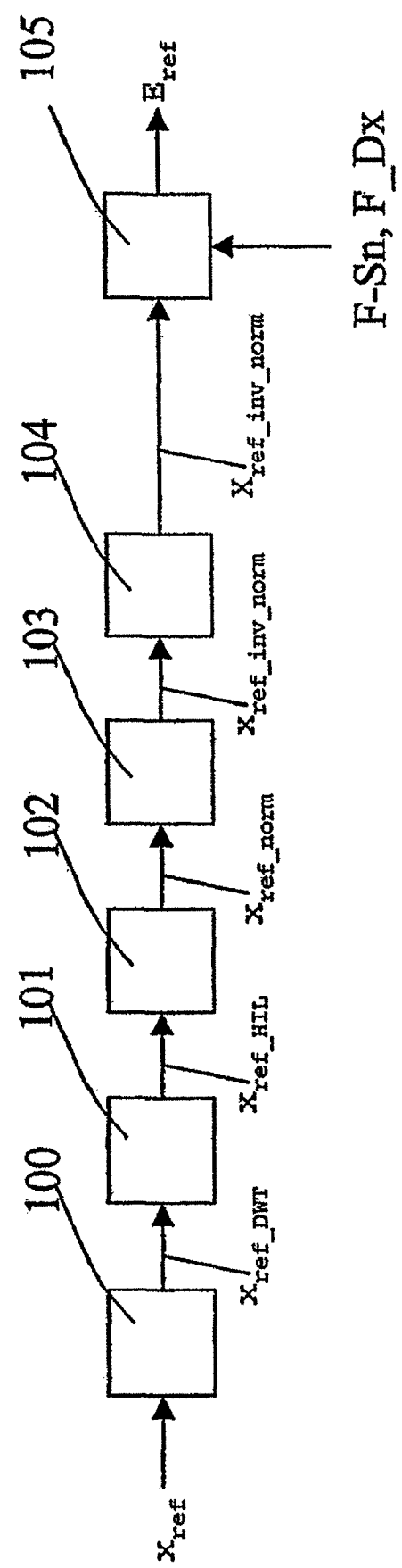
FIGS. 3, 4 and 5 are flowcharts representing operations of the method according to the invention.

The method according to the invention will now be exemplified with reference to a laser-welding method. Said laser-welding method constitutes merely, however, just one non-limiting example of an industrial process to which the method for controlling the quality of industrial processes according to the invention can be applied.

With reference to FIG. 1, the reference number 1 indicates, as a whole, a system for controlling the quality of a laser-welding process. The example relates to the case of two pieces of sheet metal 2, 3, which are welded by means of a laser beam. The number 4 designates as a whole the focussing head, including a lens 5, at which there arrives the laser beam originated by a laser generator (not illustrated) and reflected by a half-reflecting mirror 6, after passage through a lens L. The radiation E emitted by the welding area passes through the half-reflecting mirror 6 and is detected by a sensor 7 constituted by a photodiode that is able to send its outgoing signal to an electronic control and processing unit 8, associated to a personal computer 9.

In a concrete embodiment, the half-reflecting mirror 6 used is a mirror made of ZnSe, with a diameter of 2 ins and a thickness of 5 mm. The sensor 7 is made up of a photodiode with a spectral response of between 190 nm and 1100 nm and an active area of 1.1×1.1 mm and a quartz window.

FIG. 2 illustrates in greater detail the electronic control and processing unit 8 associated to the personal computer 9. Said processing unit 8 comprises an anti-aliasing filter 11, which operates on the signal sent by the sensor 7. There is then envisaged an acquisition card 12 equipped with an analog-to-digital converter, which samples the filtered signal and converts it numerically. Said acquisition card 12 is preferably directly associated to the personal computer 9.

Once again in the case of a concrete embodiment, the acquisition card 12 is a data-acquisition card of the type PC card NI 6110E, with a maximum frequency of acquisition of 5 Msamples/s.

The anti-aliasing filter 11 carries out a filtering of the signal by means of a low-pass filter (for example a Butterworth IIR filter).

In the personal computer 9, according to the invention there is implemented a method for quality control, which is based upon a comparison of a real signal $x_{real}$, acquired via the photodiode 7 and a reference signal $x_{ref}$ representing a defective weld, stored in said personal computer 9.

The reference signal, designated by $x_{ref}(t)$ is acquired at a frequency of acquisition $f_s$, and hence, according to Nyquist's theorem, has associated to it a frequency band of the signal having the value of $f_s/2$, whilst the number of samples acquired for the reference signal $x_{ref}(t)$ is N.

FIG. 3 illustrates a flowchart representing the operations performed on the reference signal $x_{ref}(t)$.

In a first step 100, an operation of filtering of the reference signal $x_{ref}(t)$ is performed by means of the application of a discrete wavelet transform (DWT). At output from the step 100 there is thus obtained a signal $x_{ref\_DWT}$ having N/2 samples in the band $0:f_s/4$.

Subsequently, a Hilbert-transform operation is applied to the signal $x_{ref\_DWT}$ in a step 101, to obtain a complex analytical signal $x_{ref\_HIL}$, having N/2 samples and null negative frequencies.

A normalization operation is applied to said analytical signal $x_{ref\_HIL}$, in a step 102, which produces at output a normalized signal $x_{ref\_norm}$.

On said normalized signal $x_{ref\_norm}$ there is then performed, in a step 103, an operation of calculation of an envelope of the normalized signal, designated by $x_{ref\_inv\_norm}$, whilst in a step 104, a fast-Fourier-transform (FFT) operation is applied to said envelope of the normalized signal $x_{ref\_inv\_norm}$, to obtain a transformed envelope $X_{ref\_inv\_norm}$.

Finally, in a step 105, an operation of calculation of the energy of the reference signal, designated by $E_{ref}$ is performed by applying the relation:

$$\int |x_{ref\_inv\_norm}(t)|^2 dt = \int |X_{ref\_inv\_norm}(f)|^2 df \quad (1)$$

As regards the real signal $x_{real}(t)$, also this is acquired at a frequency of acquisition $f_s$, and thus, according to Nyquist's theorem, has associated to it a frequency band of the signal having a value of $f_s/2$, whilst the number of samples acquired for the real signal $x_{real}(t)$ is N.

Figure 4:
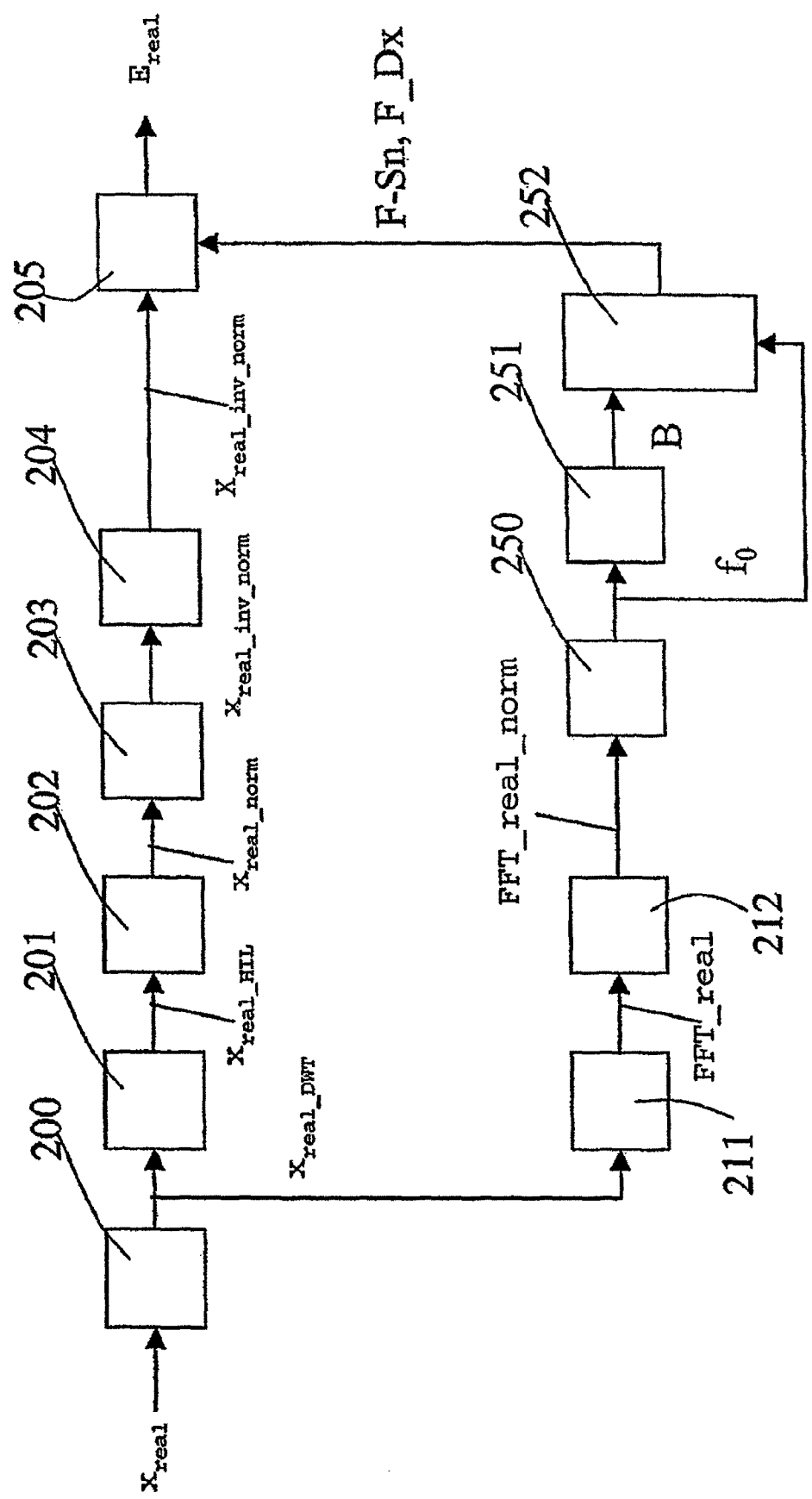

FIG. 4 illustrates a flowchart representing the operations performed on the real signal $x_{real}(t)$.

In particular, represented in FIG. 4 is a first step 200, in which an operation of filtering of the real signal $x_{real}(t)$ is performed by the application of a DWT. At output from step 200, there is thus obtained a signal $x_{real\_DWT}$ having N/2 samples in the band $0:f_s/4$.

A fast-Fourier-transform operation is performed on said signal $x_{real\_DWT}$, in a step 211, to obtain a transformed signal $FFT_{real}$, which, subsequently, in a step 212, is normalized, to obtain a transformed normalized signal $FFT_{real\_norm}$.

In a step 250, an operation of calculation of a mean frequency $f_0$ is performed on the transformed normalized signal $FFT_{real\_norm}$, according to the relation:

$$f_0 = \int f * FFT_{real\_norm}(f) * FFT_{real\_norm}(f) df \quad (2)$$

In a step 251, an operation of calculation of a standard deviation B is performed, according to the relation:

$$B = (\int f^2 * FFT_{real\_norm} * FFT_{real\_norm} df - f_0^2)^{1/2} \quad (3)$$

In a step 252, there are then calculated a lower band $F\_Sn=(f_0-B/2)$ and an upper band $F\_Dx=(f_0+B/2)$.

In parallel, in a step 201, a Hilbert-transform operation is applied to the signal $x_{real\_DWT}$, to obtain a complex analytical signal $x_{real\_HIL}$, which has N/2 samples and having null negative frequencies.

In a step 202, a normalization operation is applied to said analytical signal $x_{real\_HIL}$, which produces at output a normalized signal $x_{real\_norm}$.

On said normalized signal $x_{real\_norm}$ there is then performed, in a step 203, an operation of calculation of the envelope, designated by $x_{real\_inv\_norm}$, whilst, in a step 204, a fast-Fourier-transform operation (FFT) is applied to said envelope of the normalized signal $x_{real\_inv\_norm}$, to obtain a transformed envelope $X_{real\_inv\_norm}$.

Finally, in a step 205, an operation of calculation of an energy of the real signal $E_{real}$ is performed by applying the following relation:

$$\int |x_{real\_inv\_norm}(t)|^2 dt = \int |X_{real\_inv\_norm}(f)|^2 df \quad (4)$$

The operations of calculation of the energies $E_{real}$ and $E_{ref}$ are performed in a band delimited between the lower band F_Sn and the upper band F_Dx calculated in step 252. In greater detail, the calculation is performed on the band thus delimited, considering frequency steps, for example of one hertz, i.e., $$\int_{F^s} |X_{real\_inv\_norm}(f)|^2 df \text{ step}^{F\_DX} |X_{real\_inv\_norm}(f)|^2 df$$

$$\int_{F^s} |X_{ref\_inv\_norm}(f)|^2 df \text{ step}^{F\_DX} |X_{ref\_inv\_norm}(f)|^2 df$$

In this way, the operation of calculation of the energies $E_{ref}$ and $E_{real}$ produces two respective vectors, namely a vector of energies of the reference signal Energy_Ref_step (1, ... k), and a vector of energies of the real signal Energy_Real_step (1, ... k), both comprising k frequency values.

Figure 5:
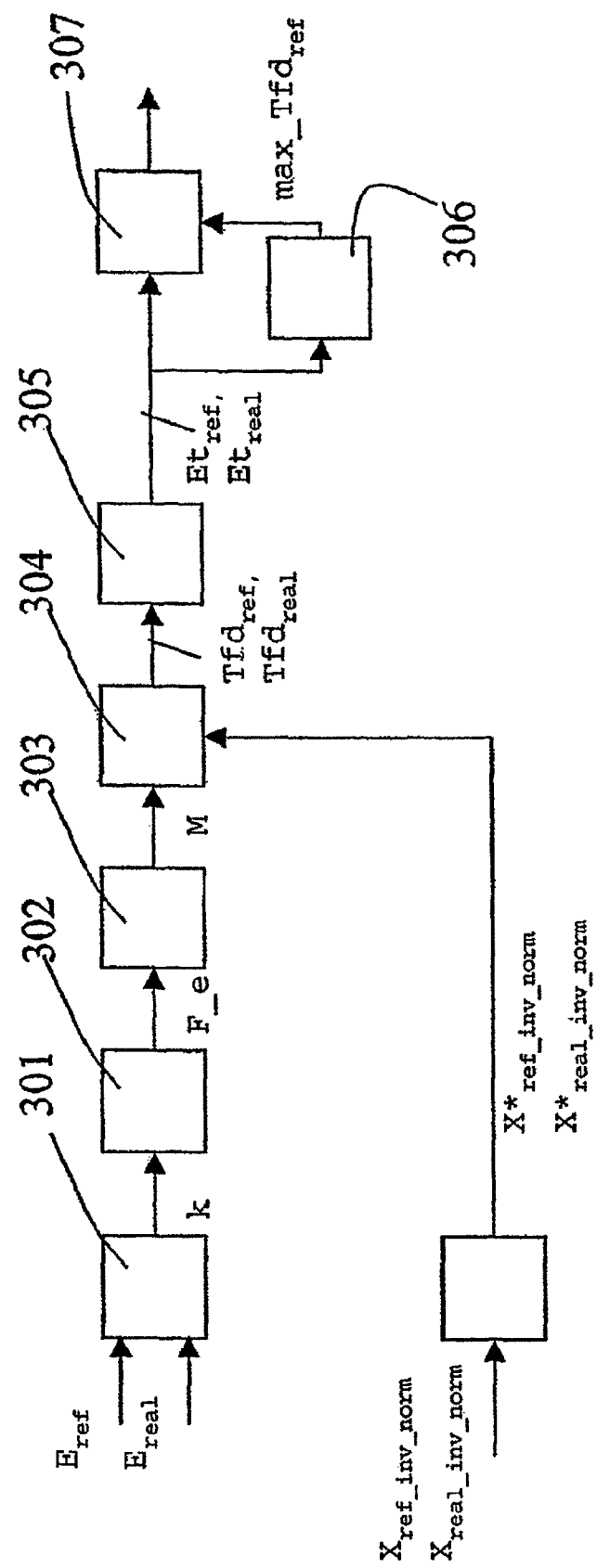

Subsequently, a procedure of calculation of the quadratic time-frequency distributions is performed, illustrated in the flowchart of FIG. 5, which comprises the following operations:

- in a step designated by 300, calculating the conjugates of the fast-Fourier transforms (FFTs) of the envelope of the real signal $X_{real\_inv\_norm}(f)$ and of the envelope of the reference signal $X_{ref\_inv\_norm}(f)$, to obtain conjugated transformed signals, namely, the real conjugated transformed signal $X^*_{real\_inv\_norm}(f)$ and the reference conjugated transformed signal $X^*_{ref\_inv\_norm}(f)$, respectively;
- in a step 301, considering the energies of the reference signal $E_{ref}$ and of the real signal $E_{real}$, represented, respectively, by the vector of energies of the reference signal Energy_Ref_step (1, ... k) and the vector of energies of the real signal Energy_Real_step (1, ... k), and, for each element k of said two vectors, assessing whether the following criterion is satisfied:

$$\text{Energy\_Real\_step }(1,\ldots k) > \text{Energy\_Ref\_step }(1\ldots k) \quad (5)$$

Figure 6:
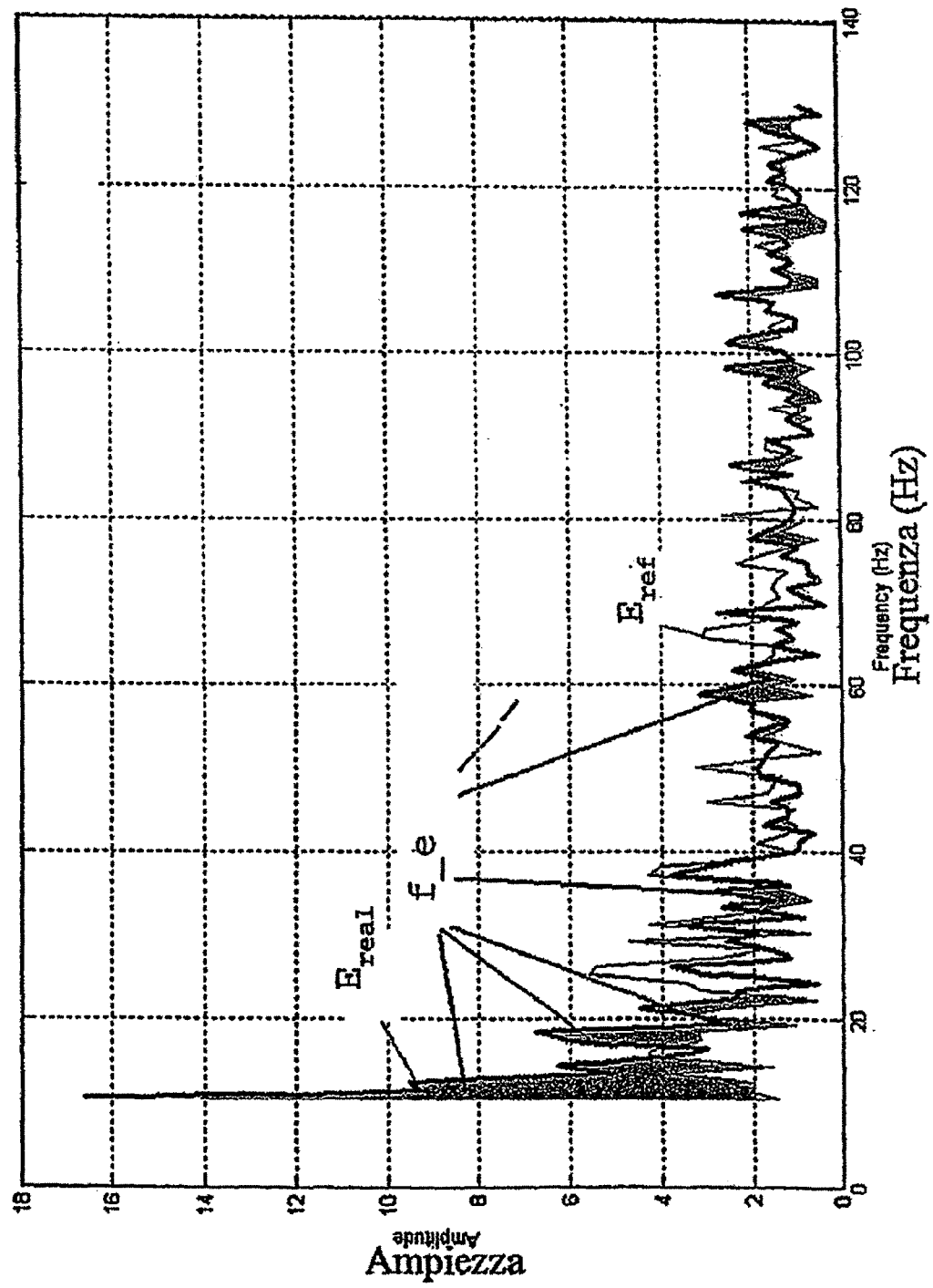
FIG. 6 is a diagram of quantities processed by the method according to the invention.

This operation can be appreciated also with reference to the graph of FIG. 6, which shows the amplitudes of the energy of the reference signal $E_{ref}$ and of the energy of the real signal $E_{real}$ (thicker line) as a function of the frequency;

- if the criterion (5) is satisfied, in a step 302 carrying out an operation of extraction of the frequency value for which said criterion (5) is verified, said value being indicated as f_e; according to how many times the condition is satisfied, obtaining up to a maximum of k frequency values f_e; FIG. 6 shows the regions corresponding to the frequency values f_e for which the criterion (5) is satisfied;
- in a step 303, constructing a matrix M, the rows of which are represented by the extracted frequency values f_e, whilst the columns are represented by N/2 temporal values $t_1 \ldots t_{N/2}$ of the signal at output from the DWT operation 200;
- in a step 304, for each row of the matrix M, calculating a quadratic time-frequency distribution both for the reference signal, designated by $Tfd_{ref}$, and for the real signal, designated by $Tfd_{real}$, using the Margenau-Hill relation, namely $$Tfd_{real} = \text{Real}(x_{real\_DWT}(t) \cdot X_{real\_inv\_norm}^*(f) \cdot \text{and}^{-j2\pi f}) \quad (6)$$

$$Tfd_{ref} = \text{Real}(x_{ref\_DWT}(t) \cdot X_{ref\_inv\_norm}^*(f) \cdot \text{and}^{-j2\pi f}) \quad (7)$$

then, in a step 305, calculating, for both the reference signal and the real signal, energies associated to the distributions for each instant of time, designated as $Et_{ref}$ and $Et_{real}$, respectively; and then, in a step 306, calculating a maximum value of the energy $\max\_Tfd_{ref}$ for the time-frequency distribution of the reference $Tfd_{ref}$.

Finally, in order to obtain an estimate of the defects, in a step 307 each temporal value of the energy $Et_{real}$ of the quadratic time-frequency distribution of the real signal $Tfd_{real}$ is compared with the maximum value of the energy $\max\_Tfd_{ref}$.

If said value of energy of the quadratic time-frequency distribution of the real signal $Tfd_{real}$ exceeds the maximum value of the energy $\max\_Tfd_{ref}$, this means that there is a defect on that time co-ordinate.

In this way, it is possible to locate the defects in time.

Of course, without prejudice to the principle of the invention, the details of construction and the embodiments may vary widely with respect to what is described and illustrated herein purely by way of example, without thereby departing from the scope of the present invention.

The invention claimed is:

1. A system for controlling quality of a manufacturing process for recognizing defects in result of a production, comprising:
    sensor which detects one or more process parameters; and
    an electronic control and processing unit configured to process the signals issued by said sensor and configured to control the quality of the manufacturing process,
    wherein said electronic control and processing unit is configured to acquire, by detecting one or more quantity of the production of said manufacturing process, one or more real signals produced by a machine involved in the manufacturing process, where the one or more real signals are indicative of the quality of said manufacturing process;
    wherein said electronic control and processing unit comprises storing means for storing one or more reference signals corresponding to said one or more real signals and indicative of a good-quality process for the manufacturing process and is configured to provide from the storing means said one or more reference signals corresponding to said one or more real signals and indicative of a good-quality process for the manufacturing process;
    wherein said electronic control and processing unit is further configured by a computer-executable software code loaded in a memory of said electronic control and processing unit to obtain a reference transformed signal from said reference signal storied in the storing means and to acquire a transformed real signal from said real signal, and is configured to convert each of the transformed real signal and the transformed reference signal into a respective vector of energies, where the vector of energies comprises an integer number k of frequency values; and
    wherein said electronic control and processing unit is further configured by a computer-executable software code loaded in the memory of said electronic control and processing unit to compare said one or more reference signals with said one or more real signals to identify the defects in the result of the production, wherein said electronic and control processing unit is configured to compare by:
        comparing said vector of energies of said transformed reference signal with said vector of energies of said transformed real signal and selecting frequency values among said k frequency values on the basis of said comparison, respectively, for extracting corresponding time-frequency distributions for said selected frequency values;
        calculating energies of said time-frequency distributions; and
        comparing the energies of said time-frequency distributions with threshold values in order identify energy values associated with said defects, and the corresponding time coordinates of said defects.

2. The system according to claim 1, wherein said industrial process is a laser-welding process.

3. A system for controlling quality of a manufacturing process for recognizing defects in result of a production, comprising:
  means for detecting one or more process parameters; and
  means for processing the signals issued by said detecting means,
  wherein said processing means are means for controlling the quality of the manufacturing process such that:
    said processing means are means for acquiring, by detecting one or more quantity of the production of said manufacturing process, one or more real signals produced by a machine involved in the manufacturing process, where the one or more real signals are indicative of the quality of said manufacturing process;
    said processing means are means for providing one or more reference signals corresponding to said one or more real signals and indicative of a good-quality process for the manufacturing process;
    said processing means are means for obtaining a transformed signal from said reference signal; for obtaining a transformed signal from said real signal; for converting each of the transformed real signal and the transformed reference signal into a respective vector of energies, where the vector of energies comprises an integer number k of frequency values; and
    said processing means are means for comparing said one or more reference signals with said one or more real signals in order to identify the defects in the result of the production,
    wherein said comparison means are means for comparing said vector of energies of said transformed reference signal with said vector of energies of said transformed real signal and selecting frequency values among said k frequency values on the basis of said comparison, respectively, for extracting corresponding time-frequency distributions for said selected frequency values, means for calculating energies of said time-frequency distributions, and means for comparing the energies of said time-frequency distributions with threshold values in order identify energy values associated with said defects, and the corresponding time coordinates of said defects.

4. The system according to claim 3, wherein said industrial process is a laser-welding process.

5. An apparatus which controls quality of a manufacturing process and which recognizes defects in result of a production, the apparatus comprising:
  a memory which stores process parameters detected by at least one sensor and software modules that process the detected parameters and that control the quality of the manufacturing process; and
  a processor which executes the software modules,
  wherein the software modules comprise:
    a module configured for acquiring, by detecting one or more quantity of the production of said manufacturing process, one or more real signals produced by a machine involved in the manufacturing process, where the one or more real signals are indicative of the quality of said manufacturing process;
    a module configured for one or more reference signals corresponding to said one or more real signals and indicative of a good-quality process for the manufacturing process;
    a module configured for obtaining a transformed signal from said reference signal;
    a module configured for obtaining a transformed signal from said real signal;
    a module configured for converting each of the transformed real signal and the transformed reference signal into a respective vector of energies, where the vector of energies comprises an integer number k of frequency values; and
    a module configured for comparing said one or more reference signals with said one or more real signals in order to identify the defects in the result of the production, wherein the comparing module is further configured for:
    comparing said vector of energies of said transformed reference signal with said vector of energies of said transformed real signal and for selecting frequency values among said k frequency values on the basis of said comparison, respectively, for extracting corresponding time-frequency distributions for said selected frequency values;
    calculating energies of said time-frequency distributions; and
    comparing the energies of said time-frequency distributions with threshold values in order identify energy values associated with said defects, and the corresponding time coordinates of said defects.

6. A system for controlling quality of a manufacturing process for recognizing defects in result of a production, comprising:
  sensor configured to detect one or more process parameters; and
  an electronic control and processing unit configured to process the signals issued by said sensor and configured to control the quality of the manufacturing process,
  wherein the processing unit is configured to acquire, by detecting one or more quantity of the production of said manufacturing process, one or more real signals produced by a machine involved in the manufacturing process, where the one or more real signals are indicative of the quality of said manufacturing process;
  wherein the processing unit is configured to provide one or more reference signals corresponding to said one or more real signals and indicative of a good-quality process for the manufacturing process;
  wherein the processing unit is configured to obtain a transformed signal from said reference signal; to obtain a transformed signal from said real signal; to convert each of the transformed real signal and the transformed reference signal into a respective vector of energies, where the vector of energies comprises an integer number k of frequency values; and
  wherein the processing unit is configured to compare said one or more reference signals with said one or more real signals in order to identify the defects in the result of the production, wherein the processing unit is configured to compare by:
    comparing said vector of energies of said transformed reference signal with said vector of energies of said transformed real signal and selecting frequency values among said k frequency values on the basis of said comparison, respectively, for extracting corresponding time-frequency distributions for said selected frequency values;
    calculating energies of said time-frequency distributions; and
    comparing the energies of said time-frequency distributions with threshold values in order identify energy values associated with said defects, and the corresponding time coordinates of said defects.

* * * * *